(12) United States Patent
Dautremont et al.

(10) Patent No.: US 8,087,300 B2
(45) Date of Patent: Jan. 3, 2012

(54) EDIBLE WAFER PRODUCTS PRODUCED BY EXTRUSION

(75) Inventors: Christophe Dautremont, Oye Et Pallet (FR); Rodolfo De Acutis, Rawcliffe York (GB); Hugo Piguet, Cottens (CH)

(73) Assignee: Nestec S.A., Vevey (CH)

( * ) Notice: Subject to any disclaimer, the term of this patent is extended or adjusted under 35 U.S.C. 154(b) by 400 days.

(21) Appl. No.: 12/440,157

(22) PCT Filed: Sep. 10, 2007

(86) PCT No.: PCT/EP2007/059472
§ 371 (c)(1),
(2), (4) Date: Mar. 5, 2009

(87) PCT Pub. No.: WO2008/031798
PCT Pub. Date: Mar. 20, 2008

(65) Prior Publication Data
US 2010/0037699 A1 Feb. 18, 2010

(30) Foreign Application Priority Data
Sep. 11, 2006 (EP) .................................. 06018975

(51) Int. Cl.
*G01N 3/00* (2006.01)
(52) U.S. Cl. ........................................................ 73/788
(58) Field of Classification Search ............... 73/788, 73/12.06, 12.13
See application file for complete search history.

(56) References Cited

U.S. PATENT DOCUMENTS

| 4,217,083 | A | | 8/1980 | Machuque |
| 4,217,369 | A | * | 8/1980 | Durst .............................. 426/98 |
| 4,455,333 | A | * | 6/1984 | Hong et al. ..................... 426/94 |
| 4,837,112 | A | * | 6/1989 | Calandro et al. .............. 426/463 |
| 5,124,161 | A | | 6/1992 | van Lengerich et al. |
| 5,342,642 | A | * | 8/1994 | Moore .......................... 426/556 |
| 5,962,055 | A | | 10/1999 | Desjardins et al. |
| 6,054,166 | A | | 4/2000 | Dupart |
| 6,251,452 | B1 | | 6/2001 | Weinstein et al. |
| 6,579,555 | B1 | | 6/2003 | Weinstein et al. |
| 6,586,031 | B1 | | 7/2003 | Kelly |
| 6,605,309 | B2 | * | 8/2003 | Freeman et al. .............. 426/607 |
| 7,235,276 | B2 | * | 6/2007 | Allen et al. ................... 426/549 |
| 7,851,010 | B2 | * | 12/2010 | Onwulata ..................... 426/656 |
| 2003/0035863 | A1 | | 2/2003 | Gross et al. |
| 2003/0091698 | A1 | | 5/2003 | Marsland |
| 2005/0220979 | A1 | * | 10/2005 | Baumer et al. ................ 426/656 |
| 2010/0092612 | A1 | * | 4/2010 | Hansen et al. .................. 426/63 |

FOREIGN PATENT DOCUMENTS

DE 3128109 2/1983
(Continued)

OTHER PUBLICATIONS

"Encyclopaedia of Food Science, Food Technology and Nutrition, pp. 417-20—Academic Press Ltd. London—1993."

(Continued)

*Primary Examiner* — Lisa Caputo
*Assistant Examiner* — Octavia Davis
(74) *Attorney, Agent, or Firm* — K&L Gates LLP

(57) ABSTRACT

The present invention relates to edible wafers, in particular to extruded wafers and to the use of these wafers in confectionery.

9 Claims, 6 Drawing Sheets

FOREIGN PATENT DOCUMENTS

| | | |
|---|---|---|
| FR | 946243 | 5/1949 |
| GB | 200432 | 7/1923 |
| GB | 2221603 | 2/1990 |
| WO | WO 9951111 | 10/1999 |
| WO | WO 0207538 | 1/2002 |
| WO | EP 1323347 | 7/2003 |

OTHER PUBLICATIONS

International Search Report for International Application No. PCT/EP2007/059472 mailed on Nov. 3, 2008.

Written Opinion for International Application No. PCT/EP2007/059472 mailed on Nov. 3, 2008.

* cited by examiner

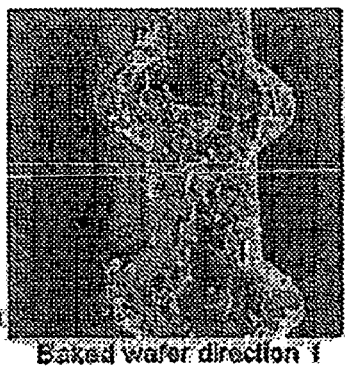
FIG 1a Baked wafer direction 1
FIG 1c Baked wafer direction 2
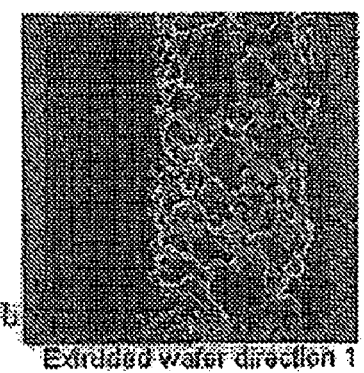
FIG 1b Extruded wafer direction 1
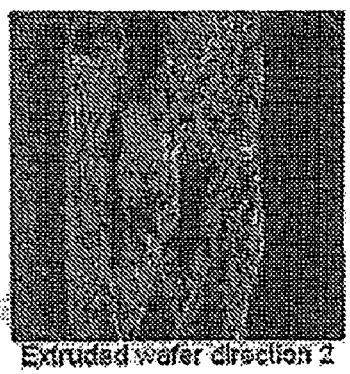
FIG 1d Extruded wafer direction 2
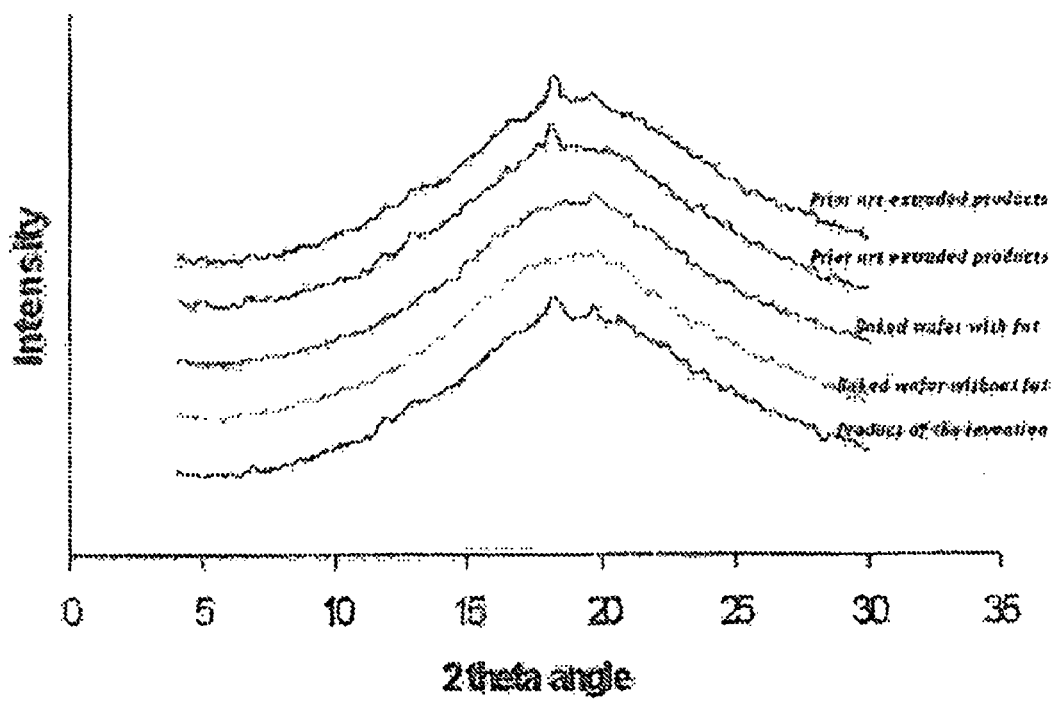
Figure 2

EDIBLE WAFER PRODUCTS PRODUCED BY EXTRUSION

FIELD OF THE INVENTION

The present invention relates to edible wafers, in particular to extruded wafers and to the use of these wafers in confectionery.

BACKGROUND OF THE INVENTION

The main types of edible wafer are described by K. F. Tiefenbacher in "Encyclopaedia of Food Science, Food Technology and Nutrition p 417-420—Academic Press Ltd London —1993". Wafers can be baked as flat sheets between hot plates as described in GB2221603, or can be baked using shaped moulds into other shapes such as cups or ice cream cones (GB200432). Traditionally, such wafers are made by baking a batter comprising wheat flour, water, some fat, and a raising agent e.g. sodium bicarbonate.

Edible wafers with a composition that causes them to be flexible when hot can be shaped after baking, for example in the production of rolled wafer cones from a sugar-containing batter. Cereal compositions can also be extruded into narrow strips which are then formed into shapes such as cones (EP 1 323 347 A1).

Flat wafer sheets are used in a number of popular confectionery products such as KIT KAT. Typically the flat wafer sheets may have a fat cream layer applied to them and then several creamed sheets, together with a non-creamed top sheet, and are assembled to form a so-called "wafer book". The wafer books are, cut into small biscuits which can be enrobed or moulded with chocolate.

Extrusion-cooking of cereal-based compositions is commonly used in the food industry. It is described for the preparation of edible food product cups in U.S. Pat. No. 5,962,055, in the making of multiple, complexly patterned extrudates in U.S. Pat. No. 6,251,452 B1, in the manufacture of confectionery having coloured fine line (U.S. Pat. No. 6,579,555 B1), and also in the manufacture of expanded shaped pellets in U.S. Pat. No. 6,586,031 B1. U.S. Pat. No. 6,054,166 further describes a process for making cooked snack by extrusion having a texture similar to traditional tortillas, crisps, or crackers. US 2003/0091698 A1 describes a dough of high-protein food material composition which may be extruded into shape and then baked to form food products such as wafers, flat breads, and waffles. Bread slices or toasts produced by a baking-extrusion-expansion process are described in U.S. Pat. No. 4,217,083.

Dough compositions for making farinaceous snacks are disclosed in WO 99/51111 and WO 02/07538 A2 for instance. DE 31 28 109 A1 also discloses a method for making homogeneous dough strips by extrusion.

The common features of the extrusion processes include the step of forming an extrudable dough, which may be cooked in a single or a twin-screw extruder under high temperature, and which is then extruded through a die. Extrusion through a die may be accompanied by expansion, depending on the water content of the dough and depending on the pressure at the die. The product may then be cut and/or further processed and cooled.

The resulting products manufactured by the extrusion processes described above commonly have disadvantages such as inhomogeneous distribution of the obtained cereal-based product. They also have a different texture to wafers baked between wafer baking plates. Many consumers favour the texture of wafers so produced when used in confectionery products.

It is an object of the invention to provide an extruded wafer product with the desirable texture of wafer conventionally baked between wafer baking plates. Additionally, it is an objective of the invention to provide a wider range of textures, thicknesses and formulations than can be achieved with conventional wafer baking processes.

SUMMARY OF THE INVENTION

Accordingly, this object is solved by means of the independent claims. The dependent claims further develop the central idea of the invention.

Thus, the invention provides, in a first aspect, an extruded expanded edible wafer characterised in that it has a crispness characterised by a number of force drops in a force applied to the wafer by a crush test probe per mm of distance traveled by said crush test probe of less than 2.5, when measured at a moisture content of 4%, and wherein the force drops with a magnitude greater than or equal to 0.8N are counted.

In a further aspect, an extruded expanded edible wafer product according to any of claims 1 to 6 obtainable by
 a. extruding a cereal-based or starch-based mix through a circular die to give an expanded non-planar extrudate,
 b. unfolding the extrudate to a flat sheet,
 c. stretching the continuous cereal-based extruded and expanded sheet and
 d. subsequently cutting the sheet to a number of flat wafer products of the desired size
is provided.

A final aspect of the invention relates to the use of a wafer or wafer product according to any of claims 1 to 8 in confectionery.

FIGURES

The present invention is described hereinafter with reference to some of its embodiments shown in the figures, wherein FIGS. 1a to 1d depict the cross-section of a wafer of the invention and of a baked wafer, as observed using a confocal laser microscope in 2 different directions.

FIG. 2 is a graph showing the intensity vs "2 theta angle" of wafers of the invention in comparison with conventionally baked wafers and prior art extruded products as determined using a wide range X-Ray scattering technique. The measurement serves as an indicator for the presence of starch-lipid complexes.

DETAILED DESCRIPTION OF THE INVENTION

In the present invention, the term "wafer" is to be understood as any cereal-based or starch-based edible product having a porous structure, delicate crisp texture, and thickness usually comprised between 0.5 and 4 mm, although the wafers of the present invention can go up to 10 mm or more. In cross section, the matrix of the wafer is highly aerated and primarily of gelatinised starch.

The ingredients of the wafers of the invention typically comprise flour, leavening agents and water. They may further also comprise fat, sugars, flavourings, pieces of edible material etc. Preferably, the wafers of the invention are manufactured using between 85-90% flour as a percentage of dry ingredients and have residual moisture content between 1-6.5%.

The wafers of the present invention differ from conventional baked wafers in that they are extruded, expanded products. They also differ from known extruded, expanded products in their crispness.

Indeed, the wafers of the invention are characterised in that they are less crisp than known extruded, expanded cereal-based products or starch-based products, and have a similar crispness to wafers baked conventionally between wafer plates.

Crispness is an attribute that relates to the number of mechanical fractures that occur upon application of a certain force and to the magnitude of the force needed to cause a fracture. Ways to quantify crispness are known in the art, notably from Mitchell, J. R. et al. in Journal of the Science of Food and Agriculture, 80, 1679-1685, 2000. Thus, crispness can be quantified by a number of parameters.

By carrying out a crush test (described in example 2), it is possible to measure the force needed to fracture a wafer. The test uses a cylindrical probe having a 4 mm diameter and a flat face for penetrating the wafer.

By applying a force onto the wafer with the probe, microfractures occur until the wafer can no longer be crushed. These fractures are related to the crispness perception when eating the product.

Figure 7:
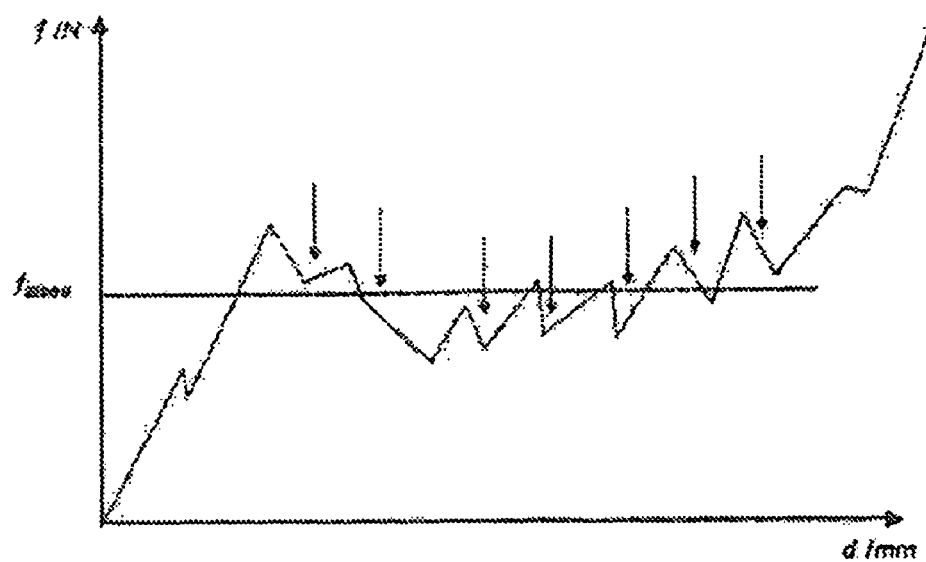
FIG. 7 is a graph illustrating a typical force variation during a crush test. Such test is described in detail further herein.

Referring to FIG. 7 showing a typical crush test force diagram, it can be seen that each time a microfracture occurs, a force drop is observed in the force applied to the wafer (indicated by arrows on FIG. 7). The number of force drops per mm and the magnitude of the force drops are indicative of the crispness of the wafer.

It has been determined that only force drops greater than or equal to 0.8N in magnitude are relevant to the assessment of crispness as they provide a good correlation to the sensory perception of crispness, notably to the acoustics associated with crispness.

Thus, by selecting only the force drops which are greater than or equal to 0.8N in magnitude, it is possible to establish a number of force drops per mm of distance traveled by the crush test probe.

Figure 8:
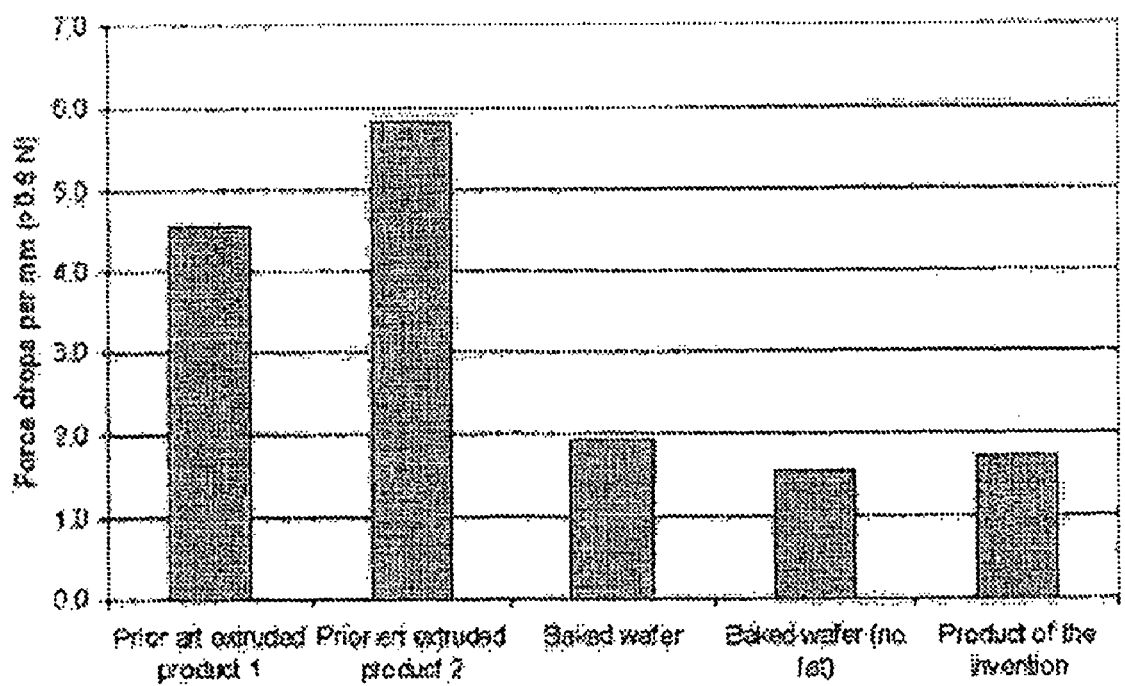
FIG. 8 illustrates the crush test measurements of force drops per mm for a variety of products including the product of the invention. Measurements for force drops greater than or equal to 0.8N ("d.8") are considered representative for crispness.

This is illustrated in FIG. 8, wherein several products including the product of the invention are compared. As can be seen from FIG. 8, the product of the invention exhibits the least number of force drops per mm. This is indicative of a low crispness. Since this value is dependent on the moisture content of the tested wafer, a standardised moisture content of 4% has been used to make the measurements and the comparisons with other products.

Thus, the wafer of the present invention has a crispness characterised by a number of force drops per mm of less than 2.5, preferably between 1.5 and 2, when measured at a moisture content of 4% and wherein the force drops have a magnitude greater than or equal to 0.8N.

This low crispness is also related to the mechanical hardness of the present wafers. By "mechanical hardness" is meant the mean penetration force which needs to be applied on a wafer to crush it. This parameter relates to the crispness of the product and can also be determined during the crush test. It is represented on FIG. 7, as $f_{mean}$.

Thus, the wafers of the invention are characterised by a relatively high mechanical hardness which is greater than 8N, preferably between 10-12N.

It is also possible from the crush test to measure the amount of work needed to make a microfracture in a wafer and in this way to further quantify the crispness of said wafer. This parameter (also described as "Wc"), expressed in N.mm, is calculated by dividing the mean force of penetration (i.e. the mechanical hardness) with the number of force drops per mm. It does therefore directly correlate with the amount of work needed to break the wafer.

It has been found that the amount of work required to fracture the wafer of the invention is the greatest compared to conventionally baked wafer or extruded products. Thus, the wafer of the invention is further characterised in that the "Wc" of said wafer is greater than 3 N.mm, preferably 4-8 N.mm, more preferably 5-7 N.mm.

The wafers of the present invention thus present a mechanical crispness which is unusual for extruded products found in the art.

The lower crispness of the extruded wafers of the present invention in comparison with known extruded products gives a closer match to the sensory attributes of wafers baked conventionally between wafer plates.

Extruded wafers are recognisable by their cross-section which differs from the cross-section of a conventional baked wafer. Microscope images of the cross-section of an extruded wafer according to the present invention can be seen in FIG. 1b compared with conventionally baked wafer shown in FIG. 1a. Referring to FIGS. 1a and 1b, it can be seen that baked wafers have a region close to their surface where there are no large gas cells. This region has been in contact with the hot plates. In contrast thereto, the wafer of the invention does have large gas cells close to its surface.

A further characteristic of the extruded wafers of this invention is anisotropy. The air cells of extruded wafers are elongated in the direction of extrusion. FIG. 1d shows a cross-section in a plane parallel to the direction of extrusion, while in FIG. 1b the cross-section is taken perpendicular to the direction of extrusion. The cross-sectional images are very different. For the baked wafer, FIG. 1c shows a cross-section perpendicular to that of FIG. 1a, but for baked wafers the two cross-section images are essentially the same. Another visual characteristic of extruded wafers is that striations can also often be seen on their surface in the direction of extrusion.

Another manifestation of anisotropy in extruded wafers is that they exhibit different mechanical properties in different directions within the plane of the wafer.

Figure 3:
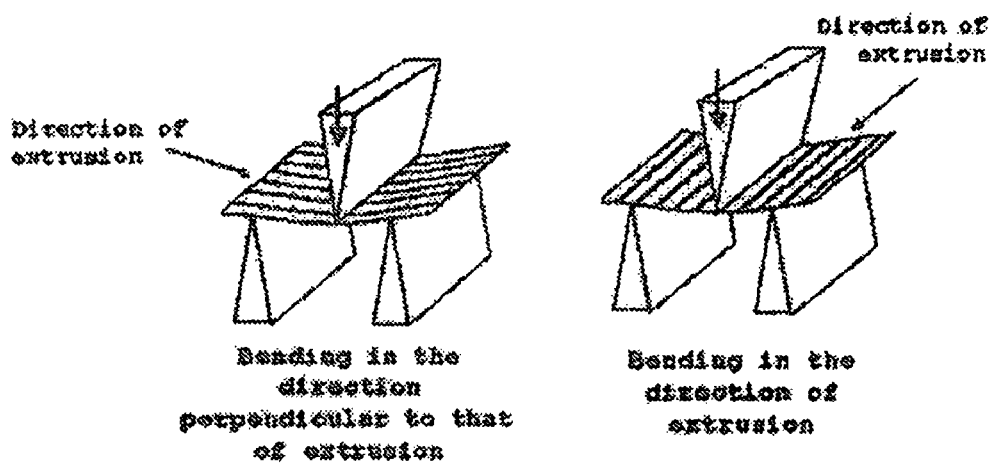
FIG. 3 illustrates the 2 directions used for testing the bending stiffness and the bending strength of the wafer of the invention.
Figure 4:
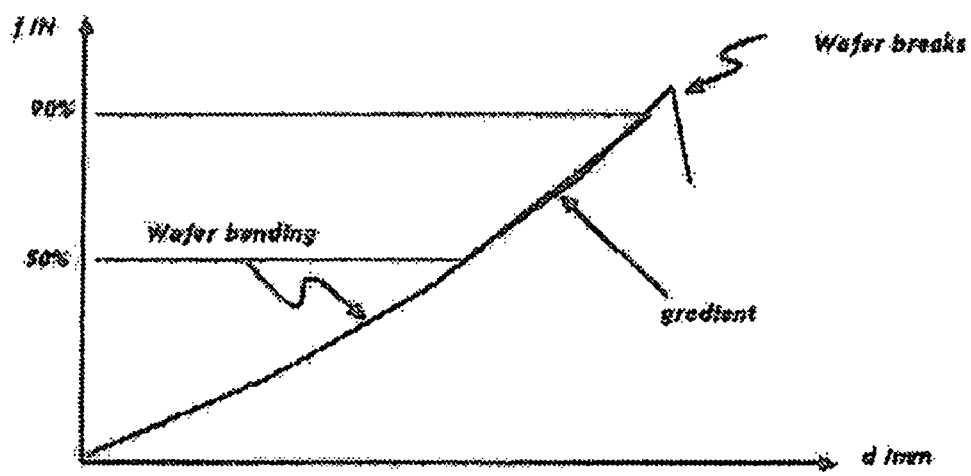
FIG. 4 depicts the force vs distance curve obtained when carrying out bending measurements.
Figure 5:
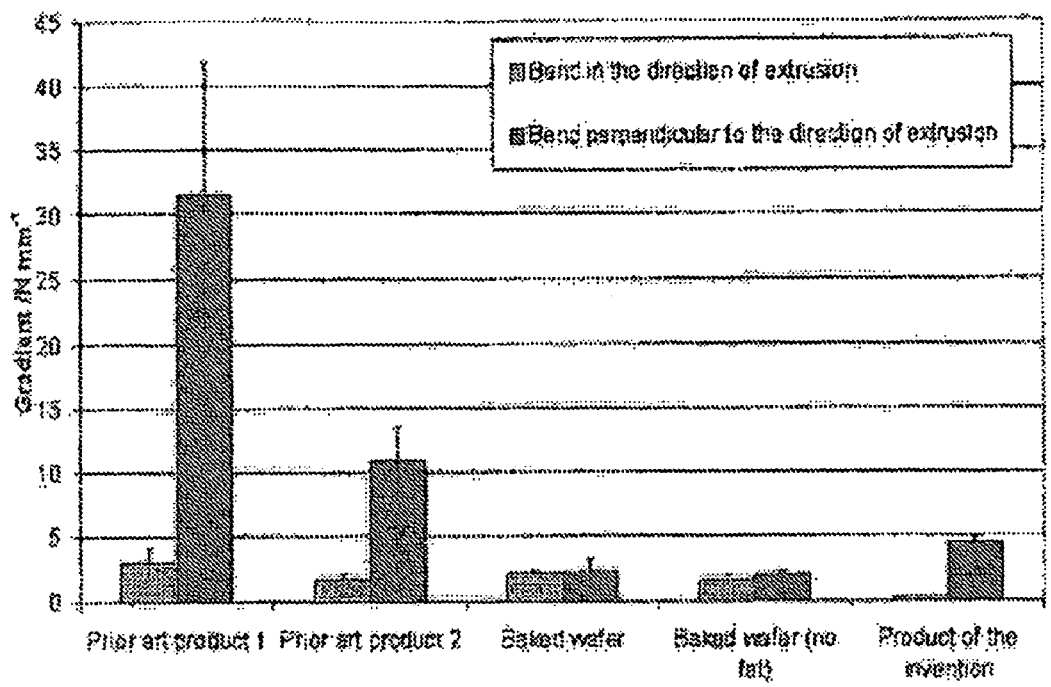
FIG. 5 illustrates the bending stiffness in $N.mm^{-1}$ in the direction and perpendicular to the direction of extrusion of a variety of products including the product of the invention.

For instance, when submitted to texture analyses and in particular to bending measurements, the wafers exhibit a bending stiffness in the direction perpendicular to that of extrusion which is two or more times greater than the bending stiffness in the direction of extrusion (cf. FIGS. 4 and 5). Bending stiffness is a measure of how much force (N) is applied to bend the wafer by a certain distance (mm) until the wafer breaks. These measurements are further described in Example 3. Typically, the wafers of the invention exhibit a bending stiffness of less than 1N/mm in the direction of extrusion, whereas the bending stiffness in the direction perpendicular to that of extrusion is between 1 and 5 N/mm.

Figure 6:
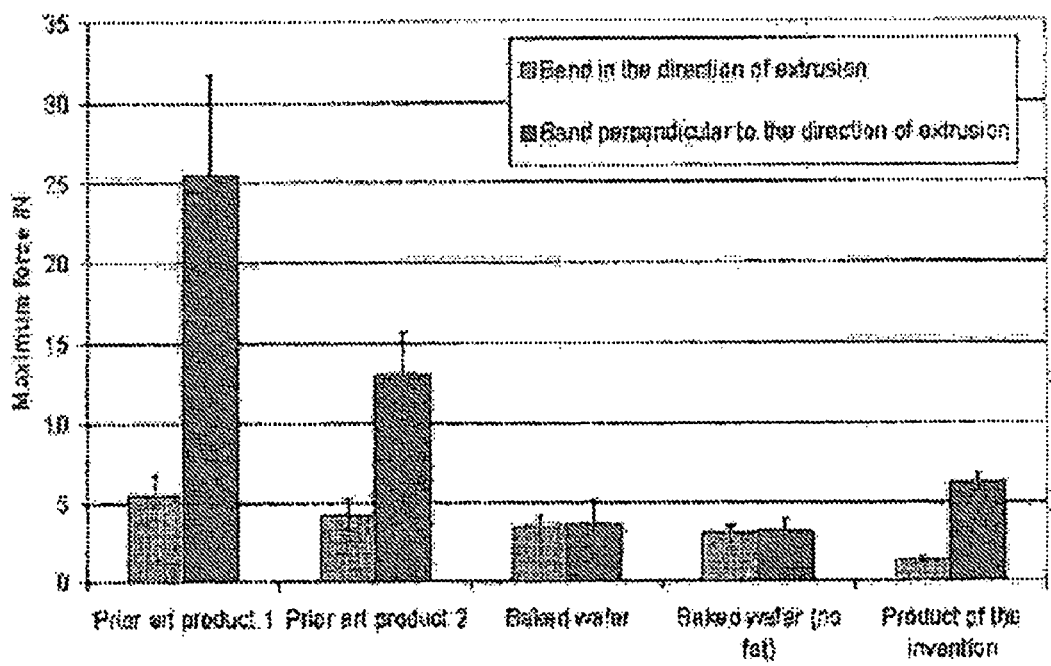
FIG. 6 illustrates the maximum bending strength in N in the direction and perpendicular to the direction of extrusion of a variety of products including the product of the invention.

Similarly, referring to FIG. 6, the bending strength can be evaluated in terms of the maximum force (N) that can be applied to a wafer before it breaks. For the wafers of the invention, the maximum bending strength in the direction perpendicular to the extrusion direction is two or more times greater than in the direction of extrusion. Typically, for the wafers of the invention, the maximum bending strength in the direction of extrusion is less than 5N, preferably it is between 1N and 3N while in the direction perpendicular to the extrusion direction, it is more than 4N, preferably between 5N and 8N.

The wafers of the invention contain gelatinised starch. Preferably all the starch present in the wafer is in a gelatinised form as shown by the absence of characteristic crystalline peaks in the X-Ray pattern (FIG. 2). The X-Ray analyses of the wafers of the invention further show the presence of starch-lipid complexes with a peak at a $2\theta$ angle of around 18. Such starch-lipid complexes are characteristic of extruded wafers because they are not observed for conventional baked wafer, with or without fat in the recipe.

The wafers of the invention have an effective density between 0.1 $g/cm^3$ and 0.5 $g/cm^3$. Preferably, between 0.2 and 0.4 $g/cm^3$.

The relative density of the wafers of the invention is preferably greater than 0.35. Consequently, the porosity of the wafers of the invention is preferably less than 65%, which is lower than conventional wafers.

Typically, the wafers of the invention have a thickness between 0.5 and 10 mm, preferably between 1 and 5 mm, more preferably between 1.5 and 3 mm.

In summary, the unique combination of characteristics described above in the wafers of the invention can offer a desirable alternative to known products in terms of texture, taste, mouth feel etc. The wafers indeed offer a unique porous, crispy, light texture dissolving rapidly in the mouth and are particularly suitable for use in confectionery. More particularly, the wafers of the invention provide many of the desirable textural attributes of baked wafers whilst having the advantage of being produced by extrusion. Extrusion has a number of advantages over baking wafers between flat plates. Among them are a lower energy consumption, an easy change-over between products, less waste produced during production, flexibility in shape and an option for continuous process by using continuous wafer sheets instead of separated sheets.

For instance, applications for the wafers of the present invention, may include products to be consumed as such or products which form the basis for an edible product by sandwiching it with cream and/or coating it with, for example, a fat-based, sugar-based and/or chocolate coating etc. They may be used for ice-cream cones, biscuits, chocolate bars, confectionery products, savoury product, pet food etc. A preferred use is in confectionery wafer bars.

According to the invention, the wafers are thus obtainable by
a) extruding a cereal-based or starch-based mix through a e.g. circular die to give an expanded non-planar extrudate,
b) optionally, unfolding the extrudate to a flat sheet
c) stretching the continuous cereal-based extruded and expanded sheet and
d) subsequently cutting the sheet to a number of flat wafer products of the desired size.

This may be carried out using the wafer production line described below.

The wafer product thus obtainable may be further processed, i.e. coated, cut, used in the production of wafer books etc.

Figure 9:
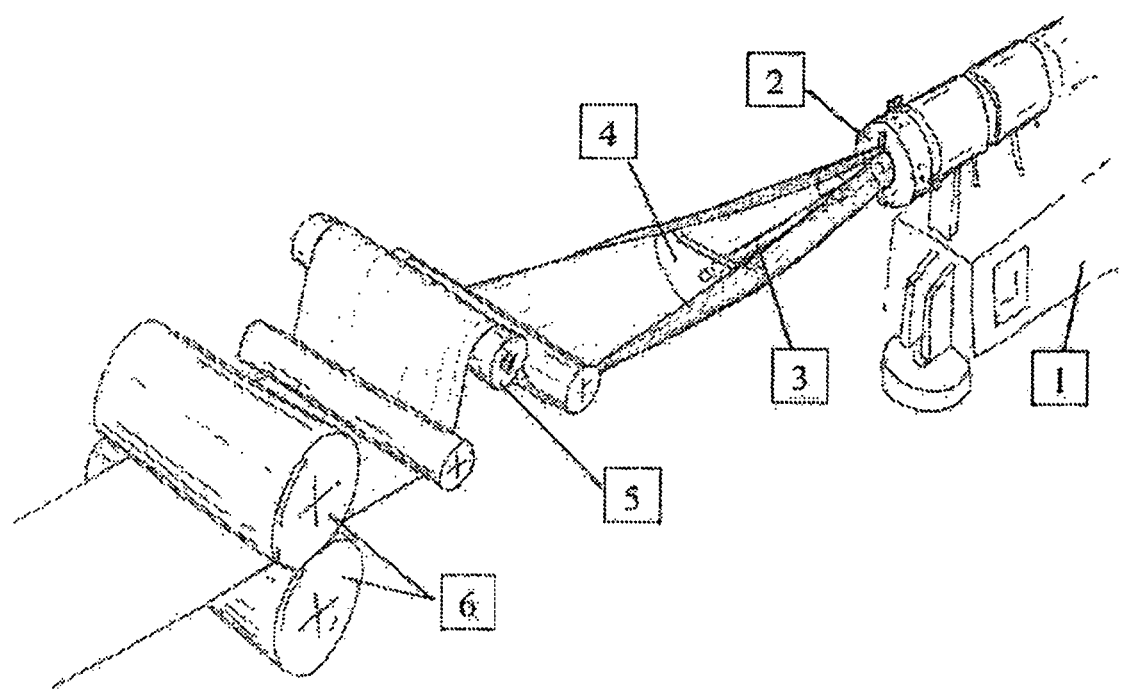
FIG. 9 depicts part of a production line (the extruder, the circular die head, the unfolding of the tubular structure into a sheet, the deflector, stretching unit, pulling/laminating unit) which may be used to produce a product according to the invention.
Figure 10:
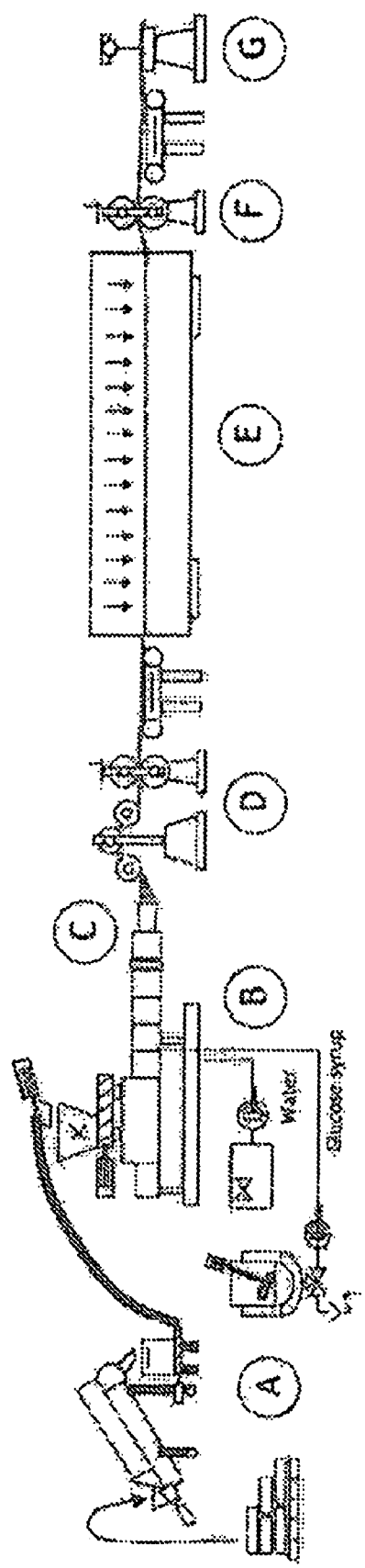
FIG. 10 depicts a wafer production line which may be used to produce a product according to the invention.

Details of such a process by which the wafers of the invention are obtainable is described further herein, with reference to FIGS. 9 and 10.

For instance, a method for producing the wafers of the invention may consist, in a first step, in preparing an ingredient mix. The ingredient mix may be dry or moist. Preferably, the ingredient mix is cereal-based or starch based.

The ingredient mix typically comprises 50-99% of cereal flour, from 0-50% sugar, 0.05-1.8% salt, 0-6% oil or fat and from 0 to 25% of added water. The cereal flour may be wheat, corn, barley, oats, rice, pea flour or combinations thereof, for example. The sugar may be selected from sucrose, invert syrup, fructose syrup, glucose syrup with various DE, maltodextrins with various DE etc. and combinations thereof.

The mix may also include other potential ingredients such as for example milk, milk powder, fruit powders, whole grain flours, cocoa powder, malt extract, bran (flour and/or bits), flavouring and/or colouring agents, leavening agents (typically in an amount of 0-1%), flour-improvers such as enzymes (typically in an amount of 0-0.02%), etc.

Also, the ingredient mix composition may further comprise pieces of edible material. Examples of such pieces can consist of parts of nuts, nut paste, almonds, sugar, chocolate, crunchy material, aerated material amongst others. It also includes seed husks which can be found in plain flour, for instance.

Accordingly, the present invention allows for a great variability in the recipe.

Thus, the mix may be prepared by first mixing powdery components to obtain a dry mix. The dry mix may be fed to the cooker-extruder as is, or it may be mixed together with liquid or fluid components, prior to entering the extruder.

After feeding the ingredient mix to the extruder, it may be further mixed in a first mixing section of a traditional food extruder, especially a twin screw extruder, for example. Water (and/or steam) and/or a sugar solution and/or a fat solution may be injected in the extruder. This is typically carried out at a low feed rate. The moisture in the extruder is typically between 10-25%. The water content of the mix at this stage usually does not exceed 15%. It is typically between 5-15%.

The ingredient mix is then cooked in the extruder. Cooker extruders are continuous machines gathering several unit operations (conveying, mixing, melting/cooking, expanding, shaping) into one machine (FIG. 9—part 1). Thus, the ingredient mix is fed and cooked in a twin, or single screw extruder with specific screw configuration and heating elements regulated to ensure a certain temperature profile.

Cooking the mixture may be carried out at 80 to 180° C., typically from 130 to 170° C., under 8 to 15 MPa, for 5 to 80s in subsequent sections of the extruder where the mixture is heated, compressed and sheared so that it forms a cooked thermoplastic mass. The mean residence time is around 40s. Under these conditions, the material melts due to the combination of mechanical friction produced by the screw(s) and the thermal energy given through the barrel. The melt is then conveyed to the die where it is subjected to pressure.

The thermoplastic mass may be extruded by having it pushed by the extruder screw or twin screw through the openings of a die provided for at the end of the extruder (cf. FIG. 9—part 2). As the die constitutes the final restriction at the outlet of the extruder, it has a chosen geometry which gives a defined shape to the product. Extrusion may be carried out through a e.g. circular die or any other planar or non-planar die. A curved (non-planar) die offers the advantage that a homogenous flow distribution is ensured. Thus, the cooked mix may be extruded through a circular die such that a non-planar structure is formed. The non-planar structure is usually tubular or elliptical.

Furthermore, in cereal or starch-based extrusion-cooking, when the water-containing extrudate, initially at high pressure and temperature, arrives at the die, water vaporises causing the extrudate to expand rapidly creating a foam structure. Traditionally, the extruded product directly expands or puffs by the instantaneous conversion of compressed liquid vapour into steam as the product flows through the die and into an ambient environment (moisture flash off process). Using a circular die ensures that expansion occurs all around the die. Thus an expanded, extruded non-planar structure is produced.

Furthermore, using a circular die allows manufacturing an extrudate having a large circumference and therefore a large subsequent width than in traditional cereal-containing food extrusion processes. This may be aided by the presence of a plastic cone at the die exit, which creates a first radial stretching and makes the product preferentially expand in external radial directions. The ability to produce extrudates of such dimensions presents the advantage that the production line has a greater throughput of cereal-based or starch-based extruded material and is suitable for efficiently supplying flat wafers which may be used in layering processes such as, for example, in the production wafer books.

The die head may be set up with a mechanical system using 4 screws which allow the centering of parallel surfaces called die lips during extrusion. By moving the internal lip of the die backward and forward using a nut, the thickness of the product can also be changed during extrusion.

The next step in a process of manufacture of the wafers of the present invention is the optional unfolding of the non-planar structure (if any) to give a large extruded sheet.

By "large" is meant that said extruded sheet may be used for the production of a plurality of wafers. Thus, the large sheet may be cut lengthwise, i.e. in the direction of flow of the extruded sheet, and/or widthwise, i.e. perpendicularly to the flow of the extruded sheet. Typically, the large extruded sheet will have e.g. a width of at least 8 cm, preferably at least 15 cm, more preferably at least 20 cm, even more preferably more than 25 cm.

This unfolding of the extrudate into a sheet of extruded material is typically achieved with:

the use of a one-meter shaft (FIG. 9—part 3) fixed on the die, which guides a movable cone that can be set right at the die's outlet. This plastic cone is used to maintain the product coming from the die, to create a first radial stretching and makes the product preferentially expand in external radial directions. By having a small blade and/or cutting wheel fixed at the exit of the die the product flow is separated or cut.

A second plastic deflector (FIG. 9—part 4) with defined shape fixed on the shaft at 500 mm from the die is designed to open out the product from a non-planar structure to a flat strip. This deflector also helps to limit the recurrent geometrical issues occurring when developing the product from a circular cross section to a linear cross section. An example of such a recurrent geometrical issue could be warpage or inhomogeneous texture across the product stripe.

The height difference between the die and the stretching/pulling unit is important in order to reduce the geometrical issues mentioned above. An optimum elevation of around 150 mm in the direction of the opening, from the central axis of the die and stretching/pulling unit has been determined. With the correct height difference, non-uniform stretching across the strip of product does not exceed 2%.

Thus, unfolding the non-planar structure yields a developed large strip of product. The width of the strip is usually at least 8 cm. Typically it may be at least 15 cm, even at least 20 cm, and even still it may be more than 25 cm.

Once the product is in the form of a large flat strip, it may be subjected to longitudinal stretching/pulling. A stretching unit (FIG. 9—part 5) will allow the product to be stretched longitudinally using a pulling force of about 0.1 to 80 N, typically the stretching/pulling force is between 30 and 50 N. This process is carried out just after extrusion, while the product is still thermoplastic. Typically, the stretching/pulling is carried out through between 2 to 5 sets of consecutive smooth rolls. The speeds of the stretching/pulling units may vary between 10 m/min and 50 m/min.

Optionally, the thermoplastic wafer sheet can be moulded or pressed into shapes such as hollow forms or it can be embossed with a pattern.

The extruded sheet, after being stretched and pulled, is adjusted in order to obtain a desired thickness. This is typically achieved by a laminating step. By lamination is meant the process of reducing the wafer thickness to form a thin layer such as by passing between rollers. The wafers produced can be essentially flat.

In this case, a pulling and laminating unit (FIG. 9—part 6) is used to drive the product from the die to line. It applies a certain longitudinal stretching to the product and reduces the thickness of it by an operation of lamination. The laminating and pulling unit is a set of rolls driven by motors with accurate speed control. The temperature of the rolls is controlled with a water circulation system in them, in order to avoid the product sticking.

Optionally, the extruded sheet may be subjected to a second stretching/pulling step. The aim of this step is to enhance the thickness control. A low thickness (typically between 2 and 2.5 mm) is important in the production of thin wafers and also in order to avoid warpage. It thus allows the thickness to be further reduced in a very controlled way.

The stretched/pulled product is then usually dried using an infra-red (IR) heater, or by hot-air drying. Typically, the product is placed on a mesh wire belt which goes through an IR drying machine, such that infra-red radiations occur from above and below the product. The drying step typically reduces the water content of the product from about 15% to a moisture content of about 1 to 6.5%. Preferably, the wafer is dried to a final residual water content of from 1 to 4%, more preferably from 2-4%. Humidity conditioning of the product may be carried out, although this is not necessary.

A second laminating unit may optionally be used to control the thickness of the product at the exit of the dryer, while the product is still thermoplastic, and to ensure constant stretching in the longitudinal direction during the drying operation. In this second laminating unit, the temperature of the rolls is controlled with circulation of water in order to avoid the product sticking. The laminating units are important in controlling the thickness of the extruded sheet. Thickness is an important parameter which has an impact not only on the appearance of the final wafer product but also on the density thereof. The thickness of the sheet after lamination and prior to being cut is preferably between 0.5 and 10 mm, more preferably between 1-5 mm, more preferably between 1.5-3 mm.

Finally, the stretched/pulled extruded sheet is separated into a plurality of wafers of desired dimensions. Typically the separating step will be carried out with a guillotine-type cutter. To avoid any blockage and to ensure a good cut quality, the blade preferably has a circular motion with variable speed. The dimensions will vary widely depending on the applications. In any case, the large sheet will be used to produce a wide variety of wafer sizes for varied applications.

The wafers thus obtainable may further be cooled through an arch cooler.

The large extruded sheet obtainable by the process described herein may also optionally be embossed by methods known to the skilled person or may be kept flat, depending on the desired application.

Such a process may be implemented by a wafer production line such as shown in FIG. 10.

Thus, according to FIG. 10, the wafer production line may comprise, in the downstream direction an extruder (FIG. 10B) which may be fitted with a circular extrusion die (FIG. 10C).

The extruder may be a single or twin screw extruder. The extruded product has a non-planar shape upon exiting the circular extrusion die. Thus, a deflector for forming the extrudate into an extruded flat sheet is placed downstream from the extruder.

A stretching/pulling unit for stretching/pulling the product extruded by said extruder, is then placed at the die exit (after the deflector), followed by a laminating unit.

These units ensure that the extrudate is evenly stretched and will thus provide the end-product with improved texture characteristics.

A drying unit for drying the extruded product is located downstream from the laminating unit. The drying unit may be an infra-red drying unit or a hot air drying unit and ensures the product has the desired water content, preferably from 1-6.5%, more preferably from 1-4%, most preferably from 3-4%.

Optionally, a second stretching unit may be placed between the laminating unit and the drying unit.

An optional laminating unit for laminating the dried extruded product may also be present as shown in FIG. 10. The wafer production line may comprise a conveying belt (shown in FIG. 10, between part F and G) after the second laminating unit. This is to ensure a certain cooling time to make the product less thermoplastic for the separating (cutting) operation.

A separating unit for separating the extruded product into pieces of desired dimensions conclude the wafer production line. The separating unit (FIG. 10G) may be any type of cutter, e.g. guillotine cutter. It may be followed by a cooling unit, such that an arch cooler, for example, may be placed after the separating/cutting unit.

The product of the invention obtainable by a process described above presents many advantages. The use of a circular die in combination with the stretching/pulling unit confers to the products obtained advantages previously not possible using an extrusion process. The homogeneous flow distribution brought by the presence of a circular die on the extruded sheet gives an homogeneous product distribution of the extruded product.

Furthermore, the texture of the end-product is notably improved by having an evenly stretched material, with a smooth surface. The minimisation of warpage further improves the processability of the extruded product.

Usually, flat wafers baked between conventional baking plates will not cleanly release from the plates unless they are baked to a low moisture content, typically below 1.5% moisture. Thus wafers, and especially wafers used for coated/moulded finished products containing wafers, have to be conditioned in a room having an atmosphere with controlled humidity until they reach the desired moisture content. If this conditioning process is not done or not properly done, the wafer, once coated, exchanges water with its environment which causes expansion and leads to cracks in the coating.

By using a process such as that described herein, it is possible to directly produce large flat wafer sheets at higher moisture contents than is possible with conventionally baked wafers. This removes the need for the conditioning step which is time and space consuming, and which therefore increases the final cost of the product.

Furthermore, in conventional wafers, wafer sheets having a defined and non-adaptable size are cut to obtain products of the desired size. If it is desired to change the size of the product being produced these changes are limited by the need to maximize the usage of the full wafer sheet. Wafer material which remains after the desired wafer sizes are cut from the sheet and must be re-worked, which reduces throughput and increases cost. Re-equipping a wafer baking oven with baking plates of a different size is expensive. With the wafer of the invention, when a change in the size of the wafer is desired, changing the die is very easy and cost efficient.

Another advantage of the wafer according to the present invention is that the wafer can be fat-free, which is important to the calorie-conscious consumers. In conventional wafers, the batter contains some fat in order to allow the demoulding of the wafer sheet from the wafer plates (moulds). The wafer of the invention is extruded and it does not need fat, although it may contain some if desired.

The present invention is further illustrated below by way of non-limiting examples.

EXAMPLES

Example 1

Recipe

A typical ingredient composition of the invention is given in the table below.

|  | % |
|---|---|
| Dry mix | |
| Wheat flour | 90 |
| Salt | 0.2 |
| Leavening agents | 0.3 |
| Injected ingredients | |
| Glucose syrup | 4 |
| Liquid fat | 0.5 |
| Water | 5 |

Example 2

Crush Test Method

Sample: wafer of at least 2 cm².
Measurements were repeated for 10 samples of each product type and an average was taken.
Instrument: Stable Micro Systems TA-XTplus Penetration
probe: 4 mm diameter cylinder (Stable Micro Systems P/4)
Instrument Settings:
  Compression Mode
  Test speed: 1 mm s$^{-1}$
  Target strain: 90%
  Trigger force: 0.5N
Analysis:
The force/distance curve (cf. FIG. 7) looks jagged because the force drops each time a fracture occurs; these fractures are related to the crispness perception when eating the product. At the end of the test the force rises sharply due to densification of the sample. The analysis macro calculates the average force for the whole test. It then selects a region for analysis from when the probe first contacts the sample to when the force first rises above the average value (this is to avoid including the densification region of the curve in the analysis). The macro then counts the number of force drops (i.e. negative peaks) above a threshold of 0.8N (threshold chosen on the basis of good correlation to sensory perception of crispness). The number of force drops in the analysis region is normalised by dividing through by the distance traveled in the analysis region, to give the number of force drops per unit distance.

5 products were manufactured and analysed. All products had the same final composition apart from variations in final moisture (see Table 2) or as indicated:
The product of the invention with the ingredient composition of example 1.
Two further extruded products with the same final composition as example 1 but manufactured according to known prior art for crisp-bread manufacture.
A wafer, baked between wafer plates with the same final composition as example 1
A wafer, baked between wafer plates with the same final composition as example 1 except that no fat was used. (This wafer proved difficult to remove from the baking plates).

Table 1 shows the data obtained for the wafers as manufactured.
Table 2 shows the data with moisture contents of baked wafers raised to be comparable with the extruded products.

TABLE 1

| | Moisture content (%) | Force drops per mm (above a threshold of 0.8N) |
|---|---|---|
| Extruded wafer | 4.9 | 4.5 |
| Extruded wafer | 4.7 | 5.8 |
| Baked wafers with fat | 1.5 | 2.9 |
| Baked wafers no fat | 1.7 | 2.7 |
| Wafer of the invention | 4.0 | 1.7 |

Data for wafers as manufactured

TABLE 2

| | Moisture content (%) | Force drops per mm (above a threshold of 0.8N) |
|---|---|---|
| Extruded wafer | 4.9 | 4.5 |
| Extruded wafer | 4.7 | 5.8 |
| Baked wafers with fat | 4.0 | 1.9 |
| Baked wafers no fat | 4.3 | 1.6 |
| Wafer of the invention | 4.0 | 1.7 |

Data with moisture contents of baked wafers raised to be comparable with the extruded products.

From those results, it can be seen that the wafer of the invention has a low number of force drops per mm, corresponding to the low crispness of baked wafer.

Example 3

Bending Measurements (cf. FIG. 4)

3 Point Bend Method
Measurements were repeated for 10 samples of each product type and an average was taken.
sample: rectangular section of wafer 8 cm wide and at least 8 cm long
Instrument: Stable Micro Systems TA-XTplus
Attachment: Stable Micro Systems large 3 point bend rig
gap between supports: 6 cm
Instrument Settings:
  Compression mode
  Test speed: 1 mm s$^{-1}$
  Target distance: 5 mm
  Trigger force: 0.15N
Analysis:
The force/distance curve (shown in FIG. 4) shows increasing force up to a maximum where breakage of the sample occurs. The analysis macro calculates the maximum force, the distance when the maximum force occurs, and the gradient of the force/distance curve in the region between 50% and 90% of the maximum force.

The results of these measurements are shown in FIGS. 5 and 6 and show distinct anisotropy of the wafers of the invention.

The invention claimed is:

1. An extruded, expanded edible flat wafer comprising a crispness characterised by a number of force drops in a force applied to the wafer by a crush test probe per mm of distance traveled by the crush test probe of less than 2.5, when measured at a moisture content of 4%, and wherein the force drops having a magnitude greater than or equal to 0.8N are counted.

2. The wafer according to claim 1, wherein the crush test probe is a cylindrical probe having a 4 mm diameter and a flat face.

3. The wafer according to claim 1, wherein the number of force drops per mm is between 1.5 and 2.

4. The wafer according to claim 1, wherein the wafer as an effective density of between 0.1 and 0.5 g.cm$^{-3}$.

5. A method of manufacturing an edible extruded expanded wafer comprising:
  extruding a cereal-based or starch-based mix through a die to provide an expanded non-planar extrudate,
  unfolding the extrudate to a flat sheet,
  stretching the continuous cereal-based extruded and expanded sheets, and
  subsequently cutting the sheet to a number of flat wafer products of a desired size having a crispness characterised by a number of force drops in a force applied to the wafer by a crush test probe per mm of distance traveled by the crush test probe of less than 2.5, when measured at a moisture content of 4%, and wherein the force drops having a magnitude greater than or equal to 0.8N are counted.

6. A method of manufacturing a confectionery product comprising:
   extruding a confectionery mix through a die to provide an expanded non-planar extrudate,
   unfolding the extrudate to a flat sheet,
   stretching the continuous confectionery extruded and expanded sheet and
   subsequently cutting the sheet to a number of flat wafer products of a desired size having a crispness characterised by a number of force drops in a force applied to the confectionery by a crush test probe per mm of distance traveled by the crush test probe of less than 2.5, when measured at a moisture content of 4%, and wherein the force drops with a magnitude greater than or equal to 0.8N are counted.

7. An extruded, expanded edible flat wafer comprising a crispness characterised by 1.5-2.0 force drops having a magnitude of 0.8N or greater using a test probe having 4 mm diameter and a flat face when measured at a moisture content of 4%.

8. An extruded, expanded edible wafer comprising a crispness characterised by a number of force drops in a force applied to the wafer by a crush test probe per mm of distance traveled by the crush test probe of less than 2.5, when measured at a moisture content of 4%, and wherein the force drops having a magnitude greater than or equal to 0.8N are counted, wherein the wafer has a maximum bending strength in a direction perpendicular to that of extrusion of more than two times greater than the maximum bending strength in a direction of extrusion.

9. An extruded, expanded edible wafer comprising a crispness characterised by a number of force drops in a force applied to the wafer by a crush test probe per mm of distance traveled by the crush test probe of less than 2.5, when measured at a moisture content of 4%, and wherein the force drops having a magnitude greater than or equal to 0.8N are counted, wherein the wafer has a thickness of between 0.5 and 10 mm.

* * * * *